June 26, 1951　　　L. R. SMIDA　　　2,558,629
UNLOADING CONVEYER

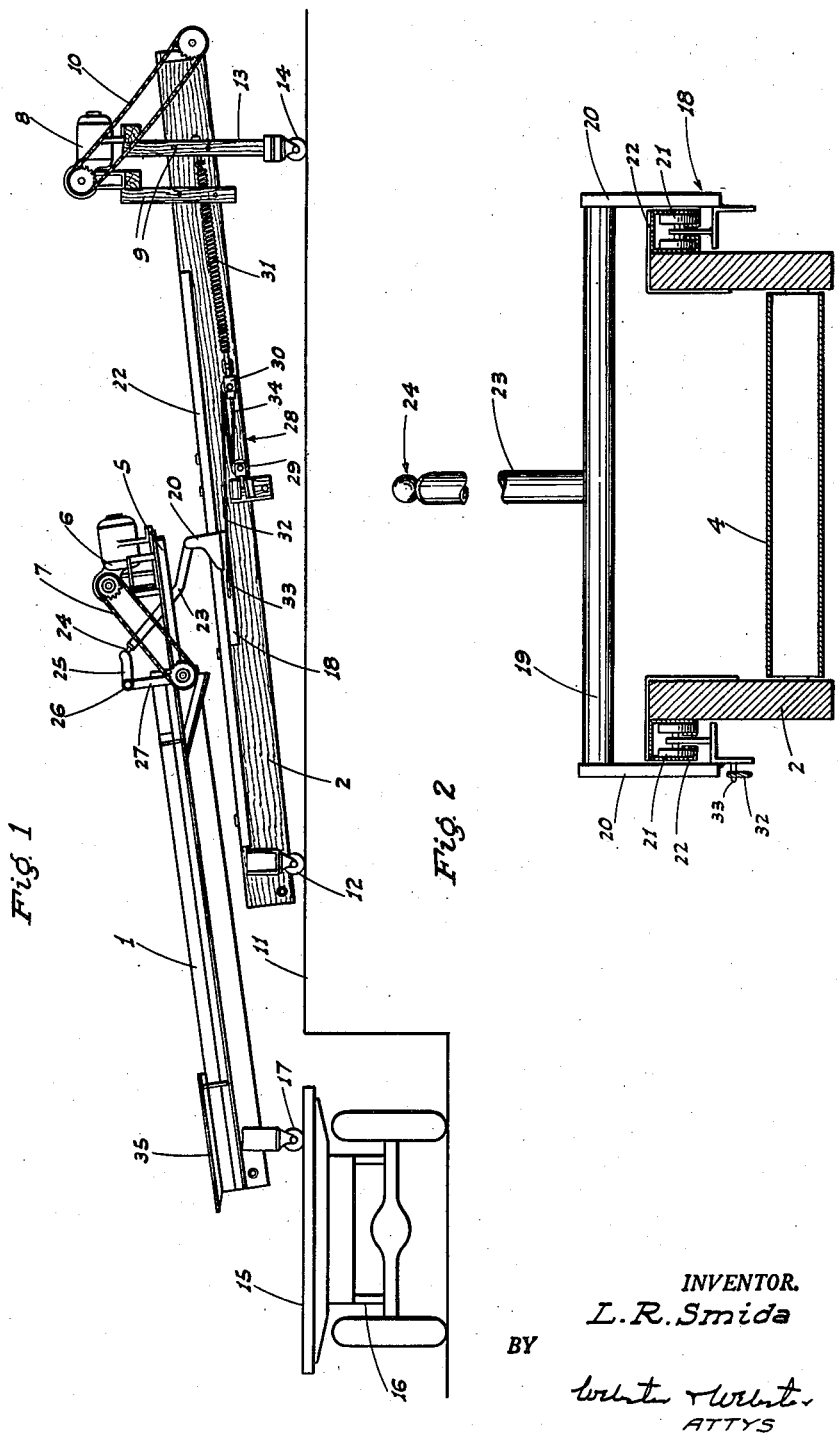

Filed March 18, 1947　　　2 Sheets-Sheet 2

INVENTOR.
L. R. Smida
BY
ATTYS

Patented June 26, 1951

2,558,629

UNITED STATES PATENT OFFICE 2,558,629

UNLOADING CONVEYER

Luverne R. Smida, Stockton, Calif., assignor to Joseph B. Schwab, Stockton, Calif., doing business as Paramount Manufacturing Co.

Application March 18, 1947, Serial No. 735,397

3 Claims. (Cl. 198—89)

This invention relates to, and it is an object to provide, a novel conveyor especially adapted for unloading bulk material from a vehicle, such as a railroad car or truck, to a platform or the like.

Another object of the invention is to provide an unloading conveyor, as above, which includes a pair of elongated, lapping conveyor sections each including a driven endless conveyor; said sections being connected together in a manner so that one section always feeds to the other while permitting of relative extension thereof; adjustment of the relative angular positions of the sections in a horizontal plane; and the support of said sections on different levels. Thus, the conveyor is readily adaptable to use between a vehicle and platform without regard to the exact spacing therebetween, spotting of the vehicle, or their relative floor levels.

A further object of the invention is to provide an unloading conveyor, as in the preceding paragraph, which includes a novel swivel connection and carriage assembly which couples the sections together for said relative adjustments, selectively.

An additional object is to provide a particularly effective counterbalancing mechanism between the carriage and the conveyor section upon which it runs.

A further object of the invention is to provide a practical unloading conveyor which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the unloading conveyor as in use.

Fig. 2 is an enlarged cross section of the lower conveyor section illustrating mainly the carriage which runs thereon.

Figure 3:
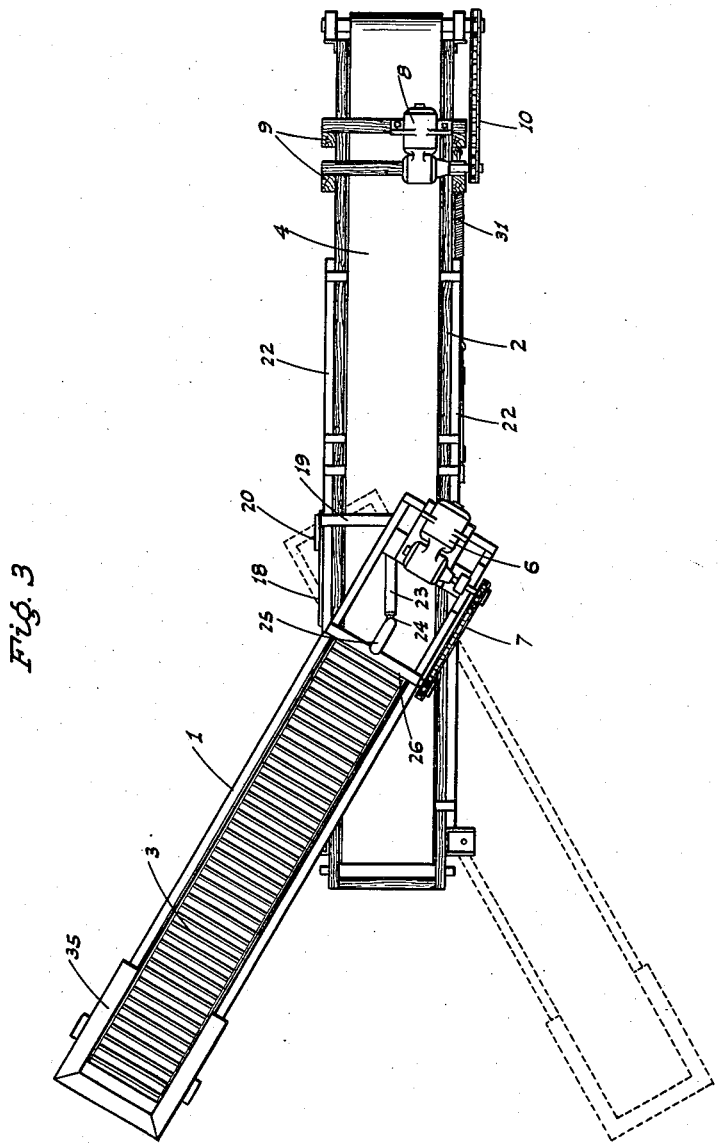
Fig. 3 is a plan view of the unloading conveyor.

Referring now more particularly to the characters of reference on the drawings, the unloading conveyor comprises a pair of elongated conveyor sections, one section—hereinafter entitled the upper section—being indicated at 1, while the other section—hereinafter entitled the lower section—is indicated at 2. Each of the conveyor sections 1 and 2 includes an endless driven conveyor; the conveyor 3 of the section 1 being foraminous, while the conveyor 4 of the section 2 is non-foraminous.

The conveyor section 1 includes, at its rear end, a rearwardly projecting, open rectangular frame 5, and an electric motor and reduction gear unit 6 is mounted on the extremity of such frame and drives the endless conveyor 3, with the upper run thereof traveling toward said unit 6, by means of an endless chain and sprocket unit 7.

The endless conveyor 4 of the lower conveyor section 2 is driven by an electric motor and reduction gear unit 8 mounted on an upstanding frame 9 on said section 2 adjacent its rear end; the driving connection being an endless chain and sprocket unit 10.

The lower conveyor section 2, which is adapted to be supported from the platform, indicated generally at 11, is disposed at a slight upward and rearward incline from its forward end. The forward end of the lower conveyor section 2 is supported by transversely spaced caster wheels 12, while the rear end of said section is supported, at a higher elevation, by transversely spaced legs 13 having caster wheels 14 on their lower ends.

The upper conveyor section 1, which is adapted to span between the bed 15 of a vehicle, such as a truck 16, and the platform 11, is fitted, at its forward end, with a pair of transversely spaced caster wheels 17 adapted to rest on the vehicle bed 15, with said conveyor section 1 extending at a slight upward and rearward incline in overlapping relation to a portion of the lower conveyor section 2.

Adjacent its rear end the upper conveyor section 1 is coupled to the lower conveyor section 2 by means of the following swivel connection and carriage assembly, whereby the conveyor sections 1 and 2 are capable of relative extension; adjustment of the relative angular positions thereof in a horizontal plane; and support of the forward end of the section 1 at a level different than the level on which the conveyor section 2 is supported.

Such swivel connection and carriage assembly comprises a carriage, indicated generally at 18, mounted on the lower conveyor section 2 for travel lengthwise thereof; such carriage 18 comprising a cross bar 19 having depending side arms 20 which carry roller units 21 engaging in channel tracks 22 along opposite sides of said lower conveyor section 2. With this arrangement the carriage 18 is movable along said conveyor section 2 for a substantial distance.

The swivel connection between the carriage 18 and the rear end portion of the upper conveyor section 1 comprises a rigid arm 23 fixed centrally on the cross bar 19, and thence extending at an upward and forward incline in clearance relation through the open rectangular frame 5 of the upper conveyor section 1. At its upper end the rigid arm 23 is coupled by a ball and socket unit 24 with a rigid, relatively short neck 25 which projects centrally from the cross bar 26 of an upstanding straddle frame 27 on the upper conveyor section 1.

By reason of the above described arrangement it will be evident that the relative extension of the conveyor sections 1 and 2 can be altered by travel of the carriage 18 along the lower conveyor section 2; the relative angular disposition of said conveyor sections can be adjusted by swinging one section about the ball and socket unit 24 as an axis; and said ball and socket unit 24 permits the forward end of the upper conveyor section 1 to be supported from a vehicle bed 15 which may be at a different level than the platform 11 which supports the lower conveyor section 2.

In order to prevent the carriage 18 from accidentally running downwardly on the lower conveyor section 2, with resultant undesirable extension of the upper conveyor section 1, the following counterbalancing arrangement is provided:

A block and tackle cable system, indicated generally at 28, is disposed along one side of the lower conveyor section 2; said cable system including sheave blocks 29 and 30, the sheave block 29 being anchored to the adjacent side of the conveyor section 2, while the other sheave block 30 is connected to a heavy-duty tension spring 31, which spring is disposed so as to normally tend to lengthen the block and tackle cable system 28. The pull lead 32 of the cable system 28 is connected, as at 33, to the adjacent side of the carriage 18, while the other end of said cable is dead-ended to the sheave block 30 as at 34. With this arrangement the carriage 18 can be run back and forth on the lower conveyor section 2 with relative ease, yet remains in any position of adjustment against accidental displacement.

When the described unloading conveyor is in use, the upper conveyor section 1 is supported, at its forward end, from the vehicle bed 15, and the lower conveyor section 2 from the platform 11, as described. Thereupon, bulk material, such as potatoes or the like, is unloaded from said bed into a hopper 35 on the forward end of the upper conveyor section 1, whence said material is carried by the endless foraminous conveyor 3 upwardly and rearwardly, any dirt or foreign matter falling from such material through such foraminous conveyor.

At its rear end the upper conveyor section 1 discharges onto the non-foraminous endless conveyor 4 of the lower conveyor section 2, and thence continues its rearward travel. The material discharges from the rear end of the lower conveyor section 2 onto the platform 11 or other carry-off apparatus, depending upon the material being handled.

By reason of the described swivel connection between the rear end of the upper conveyor section 1 and the carriage 18, including the relative central position of the ball and socket unit 24 and the relatively short, central neck 25, the conveyor section 1 dumps onto the conveyor section 2 in any position of relative adjustment of said sections.

The described unloading conveyor provides a very practical and convenient apparatus for unloading bulk material from a vehicle bed onto a platform, and the flexibility of such apparatus permits its use under widely varying working conditions.

While the unloading conveyor is especially designed for use to unload bulk material between a vehicle bed and a platform, it is obvious that the apparatus may be put to other uses to which it may be suited.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An unloading conveyor comprising a pair of elongated conveyor sections each including a driven endless conveyor, the rear end portion of one conveyor section extending above the other conveyor section, a carriage mounted on said other conveyor section for movement therealong, means coupling the rear end portion of said one conveyor section to the carriage in a manner such that the assembly of said conveyor sections is relatively extensible, said one conveyor section delivering onto the other section, and yieldable counterbalancing means connected between the carriage and said other conveyor section normally urging the carriage in a direction opposing said relative extension of the conveyor sections; said counterbalancing means comprising a block and tackle cable system extending lengthwise of said other conveyor section, one end of said block and tackle system being anchored to said other conveyor section, a tension spring connected between said other conveyor section and the opposite end of said block and tackle system and tending to lengthen the same, said system including a pull lead attached to the carriage.

2. A conveyor system comprising an upper conveyor section and a lower conveyor section, such upper section including a rearwardly projecting rectangular open frame, a motor mounted on the outer extremity of said frame, an endless conveyor belt disposed on said section and terminating adjacent the inner end of the frame, the motor being connected in driving relation with said conveyor, the lower section including a supported frame, a motor driven endless conveyor belt disposed on said lower section, a rail on each side of the latter section, a carriage having wheels travelling said rails, such carriage including a cross bar spanning the lower section in spaced relation above the same, a rigid arm on the cross bar substantially midway between its ends, such bar projecting through the open rectangular frame of the upper section and to a point above the plane of the upper side of said upper section, a straddle frame on the upper section adjacent the rectangular frame and above the plane of the upper side of said upper section, a rigid relatively short neck projecting from the straddle bar substantially midway of its ends, and a ball and socket connection between the ends of the arm and neck.

3. An unloading conveyor comprising a pair of elongated conveyor sections, each including a driven endless conveyor, the rear end portion of one conveyor section extending above the other conveyor section, a carriage mounted on said other conveyor section for movement therealong, a rigid central arm projecting upwardly from the carriage, a central rearwardly projecting neck on the rear end portion of said one conveyor section, and means swivelly connecting adjacent ends of said arm and neck to support said one conveyor from the carriage and allow of relative angular adjustment of said conveyor sections in both horizontal and vertical planes; the carriage including a rigid cross bar above the corresponding conveyor section; said arm projecting forwardly to its upper end from the cross bar whereby the rear end of said one conveyor section will be disposed sufficiently to the rear of the cross bar to prevent material discharging from said one conveyor section from falling onto the cross bar.

LUVERNE R. SMIDA.

REFERENCES CITED

The following references are of record in the file of this patent:

UNITED STATES PATENTS

| Number | Name | Date |
|---|---|---|
| 265,592 | Fox | Oct. 10, 1882 |
| 275,960 | Thomas | Apr. 17, 1883 |
| 740,559 | Hamilton | Oct. 6, 1903 |
| 892,980 | Cooper | July 14, 1908 |
| 1,576,910 | Hudson | Mar. 16, 1926 |
| 1,777,621 | Muller | Oct. 7, 1930 |
| 1,842,399 | Ghent | Jan. 26, 1932 |
| 1,999,932 | Hughes | Apr. 30, 1935 |
| 2,479,823 | Ernst | Aug. 23, 1949 |

FOREIGN PATENTS

| Number | Country | Date |
|---|---|---|
| 578,375 | France | July 1, 1924 |